(12) United States Patent
White

(10) Patent No.: US 6,684,742 B1
(45) Date of Patent: Feb. 3, 2004

(54) MACHINING APPARATUSES AND METHODS OF USE

(76) Inventor: Keith Alan White, 317 S. 950 West, Orem, UT (US) 84058

( * ) Notice: Subject to any disclaimer, the term of this patent is extended or adjusted under 35 U.S.C. 154(b) by 0 days.

(21) Appl. No.: 10/040,182

(22) Filed: Oct. 19, 2001

Related U.S. Application Data

(60) Provisional application No. 60/241,698, filed on Oct. 19, 2000.

(51) Int. Cl.⁷ .............................. B23B 1/00; B23B 7/00
(52) U.S. Cl. .......................................... 82/1.11; 82/118
(58) Field of Search ..................... 82/1.11; 409/132, 409/84; 407/42, 62, 113, 53, 54; 700/163, 160

(56) References Cited

U.S. PATENT DOCUMENTS

| | | | | |
|---|---|---|---|---|
| 4,945,487 A | * | 7/1990 | Kimura et al. ................ 407/62 |
| 4,968,195 A | * | 11/1990 | Hayakawa et al. ........... 409/84 |
| 5,087,159 A | * | 2/1992 | Thomas ....................... 409/132 |
| 5,184,306 A | * | 2/1993 | Erdman et al. ............. 700/163 |
| 5,417,130 A | * | 5/1995 | Dorsch ........................ 82/1.11 |
| 5,513,931 A | * | 5/1996 | Reiterman et al. ............ 407/42 |

* cited by examiner

*Primary Examiner*—A. L. Wellington
*Assistant Examiner*—Dana Ross

(57) ABSTRACT

A tool for shaping sculpted surfaces where at least one portion of the silhouette of the cutting edge is curved and has a radius of curvature larger than the radius of the tool itself. The profile, or silhouette of the cutting tool may have a constant radius of curvature, or a changing radius of curvature. This invention could be used either for insert-type cutters, or standard, solid cutters. It could potentially also be used for grinding or polishing. In addition, mathematical definitions which can be used for the implementation of these cutters are also presented.

6 Claims, 8 Drawing Sheets

US 6,684,742 B1

MACHINING APPARATUSES AND METHODS OF USE

CROSS-REFERENCE TO RELATED APPLICATIONS

Continuation of U.S. provisional application serial No. 60/241,698, filed on Oct. 19, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention relates to a cutter/tool and a method for machining a surface, in particular to a method of cutting or grinding with a rotary tool.

2. Description of the Prior Art

Machining is most commonly done with ball end mills (having a hemispherical end), flat end mills (having a flat bottom), and bull-nose end mills (having a flat bottom with a fillet radius between the bottom of the tool and the shank). These cutters are generally oriented perpendicular, or close to perpendicular to the surface. In some cases, milling can also be done on the shank of the tool, which generally leaves a flat/ruled surface. The cutters described herein will allow cutting in similar modes, (i.e. basically perpendicular or parallel to the surface) as well as when the tool is neither perpendicular nor parallel to the surface, and have great flexibility in the potential modes of use. The disadvantages and inefficiencies of ball end mills are very well-known to those skilled in the art and will not be discussed here. Flat end mills leave a very rough surface when inclined and are generally only used for rough machining. Bull nose end mills are only efficient when they can be more or less normal to the surface being machined, which prevents their implementation in applications where the geometry is tightly constrained. They also generally require 5-axis machines in order to be used.

Cutters with a cutting edge described by $y=f(x)$ where $f(x)$ is a curve are described in U.S. Pat. Nos. 4,968,195 and 4,945,487, but the nature of $f(x)$ curves, such as an ellipse or a parabola is fairly restrictive and these cutters have not gained acceptance. This is best explained by examining an ellipse. An elliptical cutter with a fixed set of end points cannot be modified or changed. The endpoints are factors in the defining equation of the ellipse. Thus, for a given set of endpoints, there is only one set of equations which can define that ellipse (or cutter if the ellipse is used to define a cutter). This is too restrictive for most applications, and does not offer enough efficiency gain to justify the additional programming complexity; hence, the cutters are not generally used today. A similar patent is U.S. Pat. No. 5,513,931 which describes an elliptical cutting insert, which suffers from the inherent limitations of an ellipse. U.S. Pat. No. 5,087,159 describes an end mill with a radius at the tip. This cutter is similar to a bull nose end mill in application, and efficiency is limited by the minimum radius of curvature on the milling surface. It is also restricted to applications where the cutter can be more or less perpendicular to the surface.

BRIEF SUMMARY OF THE INVENTION

The nature of the apparatus is a cutting tool where at least one portion of the cutting edge is curved and has a radius of curvature larger than the radius of the tool itself. This cutting edge may have a changing radius of curvature as well. This cutting edge may be described a single curve, or a series of curves. Generally, at least one of the curves will be of a parametric form. By using multiple curves, or a parametric curve, the additional control over shape not presented by an ellipse or parabola is gained. This will allow wider implementation of said cutters because the wider range of curvatures presented not only increases efficiency, it also increases the number/types of applications that can be used.

For instance, an elliptical cutting edge with a length of 0.25 inches and a maximum radius of curvature of 4.0 inches (the larger the curvature, generally the more efficient), will have a total curvature variation along the cutting edge of less than 10%. If a surface with areas of low and high curvature is machined, the elliptical edge will be selected based on the maximum curvatures in order to avoid over-cutting. Thus, since the curvature along a practically-sized ellipse does not vary greatly, the efficiency in the areas of low curvature is degraded. However, with a combination of curves or with a parametric curve, virtually an infinite change in shape and curvature can be created even in a short length, thus increasing efficiency. A parametric curve (where $x=f(t)$ and $y=g(t)$) is advantageous because $(x,y)$ are defined independently of each other, easily enabling an infinite number of permutations. With a parametric curve or a number of curves, the curvature can easily be made to vary by 1000% even over a short length.

DETAILED DESCRIPTION OF THE INVENTION

Figure 1:
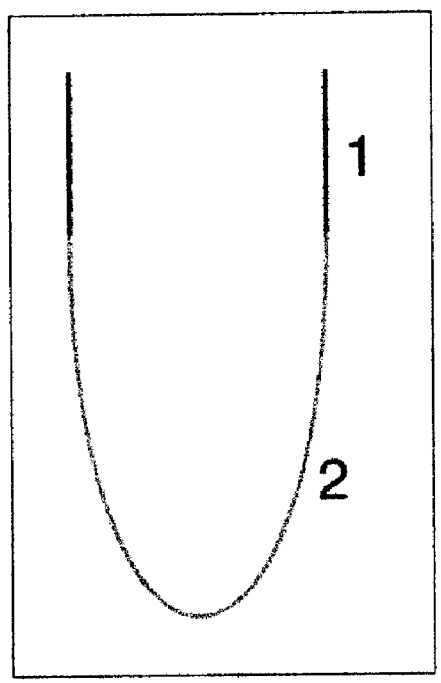
FIG. 1 is a silhouette of one example of a tool.

This invention can take many forms, and while not all of these forms will be presented here, some forms will be presented to create an impression of the overall scope and nature of the invention. A general example of this invention is shown in FIG. 1. This figure represents a cross-sectional cut of the cutter, where the cutter shape would be generated by rotating the profile about an axis through the center of the cutter. In other words, the profile shown represents the silhouette of the cutter.

In this figure, (1) represents the shank of the cutter, and (2) is a free-form curve which is the primary cutting edge of the cutter. There are an infinite number of curves or series of curves which could be used as the curve in (2) and all represent a similar concept to the one presented here. Some of the possible forms (and each form could have up to an infinite number of permutations possible are Bézier curve, or other free-form curves, such as Timmer, or B-spline curves. Another possible form would be a series of at least two curves which could then be elliptical, parabolic, freeform, arcs, etc.

In this description the term 'freeform curve' will refer to either a parametric curve, such as a Bézier, Timmer, or B-spline curve, or any combination of any number parametric and non-parametric curves such as ellipses, parabolas, arcs, or any curve generally representable by y=f(x). These curves do not have to join each other with tangent continuity although they generally will have at least tangent continuity.

Figure 2:
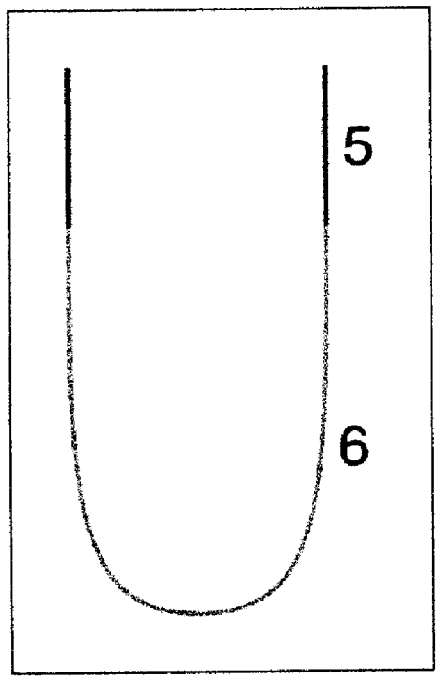
FIG. 2 is another variation of the silhouette of a tool.

One additional example with a different free-form curve is shown in FIG. 2. In this figure, the free-form cross-sectional curve is a Bézier curve. Item (5) again represents the shank of the cutter, and (6) is the free-form curve as (2) is in FIG. 1.

Figure 3:
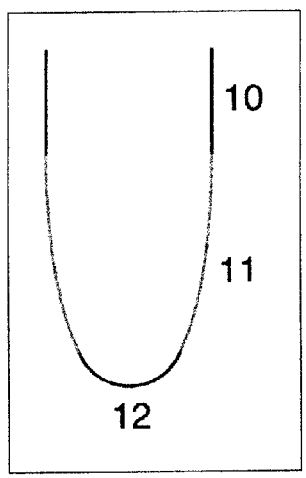
FIG. 3 is a variation of the tool silhouette with a ball nose end.

There are additionally many potential variations on this concept. For instance, the free-forn portion of the cutting edge can be combined with a different type of end, such as a ball end or a filleted end. In FIG. 3 the free-form cross-sectional curve (11), is combined with the circular profile of a ball end mill. This yields a sort of hybrid-type cutter which combines the free-form cutting edge with a spherical tip. Obviously, the shape of (1) as well as the diameter of (12) could be varied to yield an infinite number of combinations.

Figure 4:
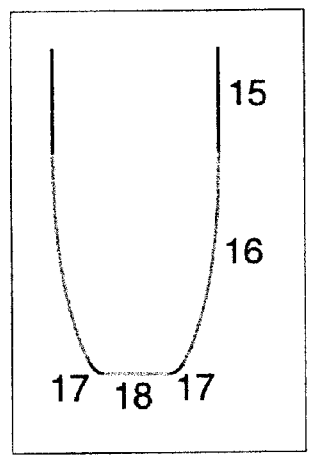
FIG. 4 is a variation of the tool silhouette with a filleted end.

Another variation on this concept is shown in FIG. 4. In this figure, the circular end is replaced by the end of a bull nose, or filleted end cutter (17,18). This edge consists of a fillet (17) which joins the flat bottom of the cutter (18). Again, the shape of (16), as well as the radius of (17) and the length of (18) could be varied in an infinite number of ways. In addition, the fillet radius (17) could also be zero, yielding a flat bottom on the cutter. The tip could also be a separate freeform section.

Figure 5:
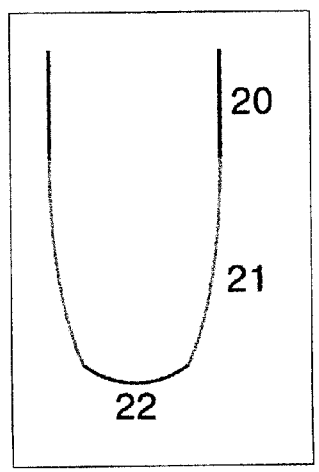
FIG. 5 is a variation of the tool silhouette where the tip does not have tangent continuity with the freeform portion.

In FIG. 3 and FIG. 4, the ball nose end and bull nose end are shown joining the free-form section with tangent (or perhaps higher) continuity. This does not have to be the case however. It would also be possible for these ends or tips to join the free-form section with only $C^0$ continuity as shown in FIG. 5. In this figure, (21) and (22) do not have tangent continuity.

Figure 6:
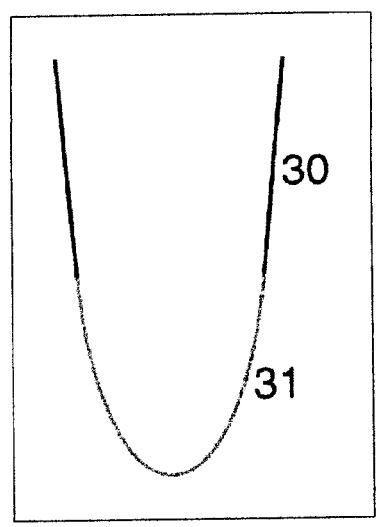
FIG. 6 is a tool silhouette with a tapered end mill.
Figure 7:
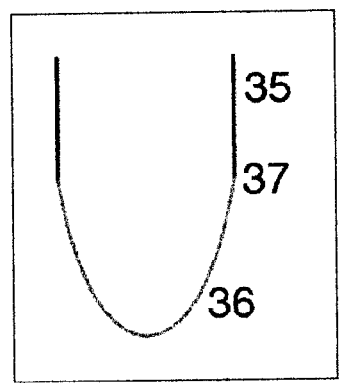
FIG. 7 is a tool silhouette with $C^0$ continuity between shank and freeform section.

This type of cutter can also be used on a tapered end mill, as shown in FIG. 6. In that figure, shank of the cutter (30) is tapered. The free-form section of the cutter (31), could also be combined with any of the ends (ball, filleted, etc.), as shown previously. Also, the free-form section of the cutter need not join the shank of the cutter with tangent (or higher) continuity as shown in previous examples. It would also be possible to have $C^0$ continuity as shown in FIG. 7. In that figure, the boundary (37) between the shank (35) and the free-form section (36), has only $C^0$ continuity.

Figure 8:
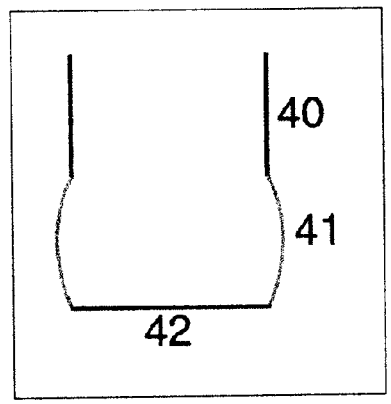
FIG. 8 is a tool silhouette with a freeform section extending beyond the shank radius

An additional variation on this concept is shown in FIG. 8. In this figure, the free-form section (41) of the cutter protrudes out a greater distance than the shank (40) of the cutter from the tool centerline. In this representation, the bottom of the cutter (42) joins the free-form section with no fillet. Again, the free-form section (41) could have any of an infinite number of shapes, and the bottom of the cutter (42) could also be in any one of the forms depicted previously (i.e. ball, filleted, additional freeform, etc.). Also, the boundaries between the different sections of the cutter could have $C^0$ or higher contintuity.

Figure 9:
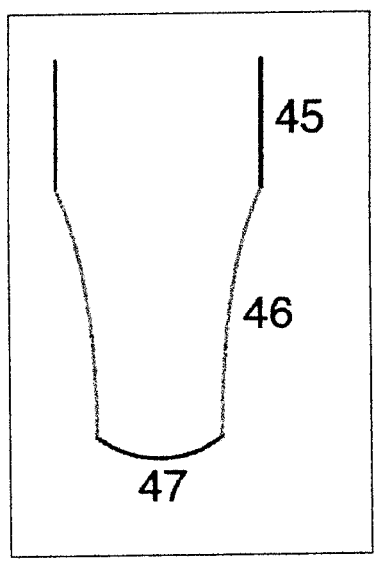
FIG. 9 is a tool silhouette with a concave freeform section.
Figure 10:
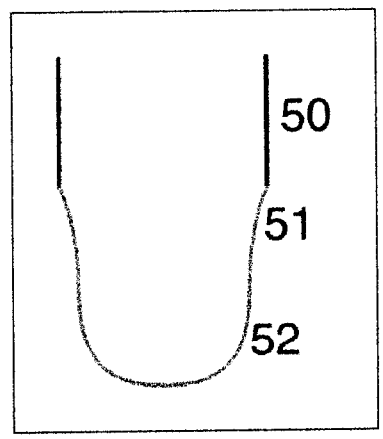
FIG. 10 is a tool silhouette with a convex and concave regions.

The cutters shown up to this point have been convex. However, this need not be the case. The free-form section (and also potentially the tip or end) could also be concave. This is shown in FIG. 9. Again, the free-form portion (46) could have any one of an infinite variety of shapes or curves, and the tip could also have any of the previously mentioned shapes. Continuity, again could be $C^0$ or higher at all boundaries. It is also possible to have a free-form shape with both concave and convex regions as shown in FIG. 10. In that figure, the free-form section has both concave (51) and convex (52) regions. Again, this type of curve could be combined with any of the ends discussed previously, with continuity options as discussed previously.

The cutters depicted up to this point would generally be implemented in five-axis (or five-plus) applications (although they could be used in three and four-axis applications). The free-form section may be used to machine a surface largely parallel to the surface which is being machined. By combining a free-form section with a different end (filleted, or free-form), the tip of the cutter could also be used to machine primarily perpendicular to the surface, or in almost any orientation with respect to the surface. This cutter can be used for applications such as blisks and impellers, with constrained geometry where it is difficult or impossible to orient the tool perpendicular to the surface. This type of cutter can also be on more open/less constrained surfaces as well. These cutters could be used in the same applications that traditional cutters are being used in.

Figure 11:
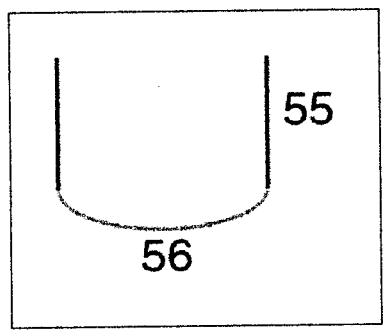
FIG. 11 is a different embodiment of a tool silhouette where the larger radius of curvature is more generally perpendicular to the tool axis.

This type of cutter geometry, which also has a radius of curvature greater than the tool radius, may be used to cut generally more open surfaces where the cutter need not be oriented parallel or close to parallel to the surface. This type of cutter could be used in three-axis, four-axis, or five-axis (and higher) applications. With the previous embodiment, the cutting edge roughly parallel to the cutting axis had a radius of curvature larger than the tool radius, and the tip or end sometimes had a radius of curvature larger than the tool radius. With this type of profile, the tip or end will have a larger radius of curvature (in at least one location) than the tool radius. Generally, the radius of curvature will not be constant although it could be. The general form for this type of cutter is shown in FIG. 11.

Here, (55) represents the shank of the cutter, and (56) is the free-form cross-sectional curve, which may have any of the forms listed previously. All of the derivations or permutations described previously that apply here, may be considered as options for this cutter. For instance, the continuity at the boundary between the shank and the free-form section may be $C^0$ or higher, a tapered shank may be used, there may be multiple freeform sections, there may be a fillet between the freeform section and the shank, etc.

Because the cutters described here do not have standard geometry (ball end, flat end, or filleted end), the mathematics necessary for their implementation are not available. In this section, mathematical definitions and formulations, and other algorithms which can be used in their implementation will be presented. While these definitions may not be entirely complete, and may not cover every single method of implementation possible, those skilled in the art will recognize that many variations are possible without departing from the scope and spirit of the invention.

Figure 12:
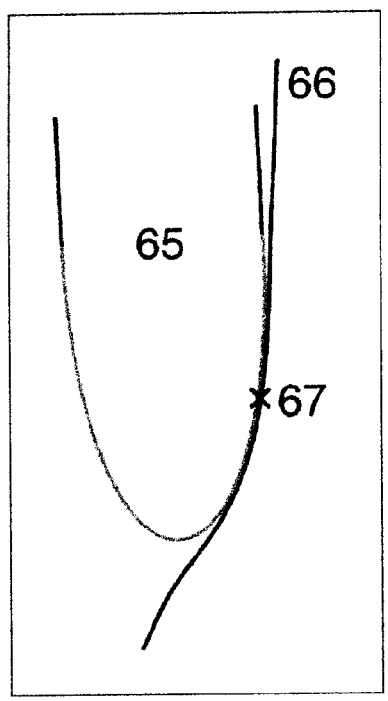
FIG. 12 is a tool silhouette shown in an optimal position on a surface.

This discussion will focus on the tools having a changing radius of curvature. Although a few of the variations discussed previously do not have this, their implementation would be similar. Because the radius of curvature (and the shape of the cutting profile) are not constant, different orientations of the tool with respect to the workpiece will yield different machining efficiencies. In other words, the efficiency of the machining process will be a function of the orientation of the tool with respect to the part being machined. One may wish to position the tool in an optimal way which maximizes efficiency without undercutting, or gouging the actual design surface in the region surrounding the cutter contact point (this is referred to as local gouging), and without creating global gouges (where any part of the tool, holder, or machine tool interferes with the part, fixtures, machine tool, etc. FIG. 12 illustrates an optimal tool position.

Figure 13:
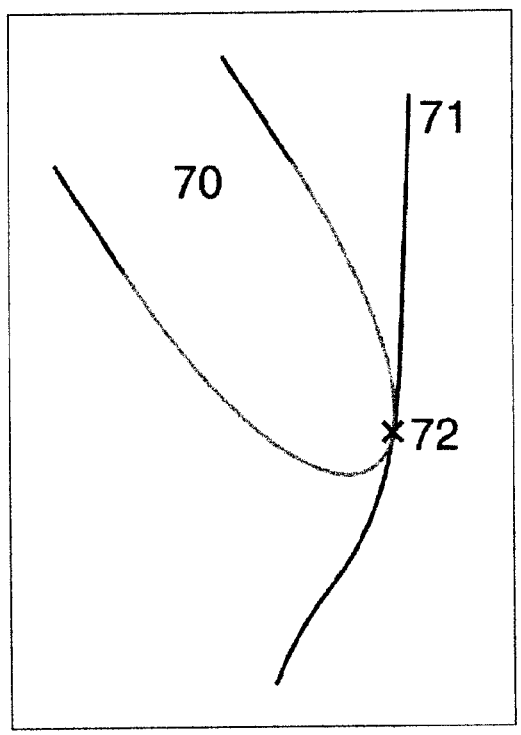
FIG. 13 is a tool silhouette shown in a non-optimal position on a surface.

In that figure (tool motion is out of the page for all figures in this section), the cutter (65), is positioned with respect to the surface (66) at the contact point (67) in an optimal way, maximizing efficiency, or effective tool step-over between adjacent tool passes, without gouging the part. In the vicinity of the contact point (67), the cutter profile matches the surface profile as closely as possible. FIG. 13 depicts a cutter positioned on the surface in a way that does not locally gouge the part, but is clearly not as efficient as the position shown in FIG. 12.

Figure 14:
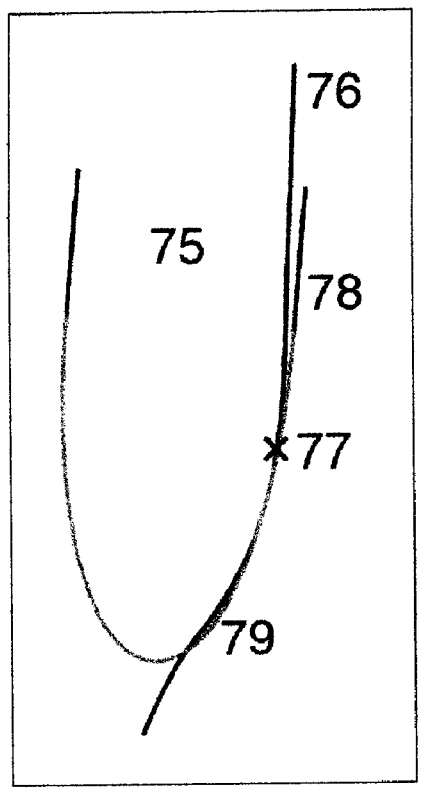
FIG. 14 is a tool silhouette shown creating a local gouge on a surface.
Figure 15:
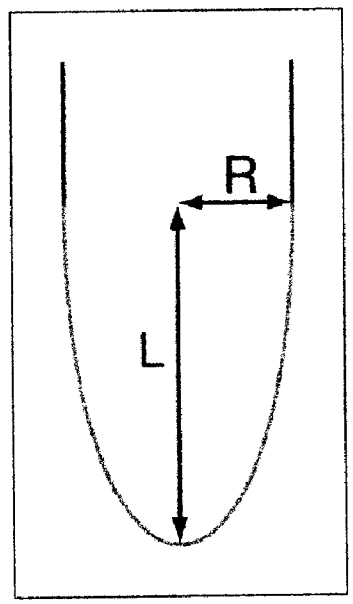
FIG. 15 is a tool silhouette of a particular $2^{nd}$ order Bézier curve.
Figure 16:
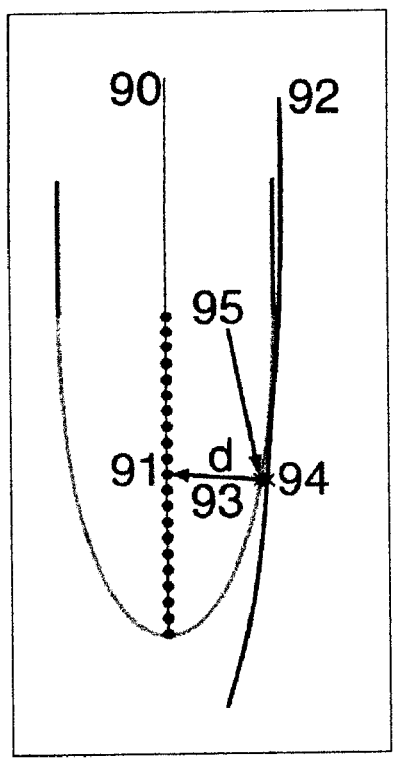
FIG. 16 is a tool silhouette that displays a methodology for local gouge detection.

FIG. 14 depicts a tool position is shown which creates a local gouging problem. In that figure, the tool (75) is positioned at contact point (77), but it locally gouges the design surface at the tool tip (79) and also on the shank and cutting profile (78) above the contact point. This is generally not acceptable, and the tool should be positioned in a way which avoids this. Not depicted here, but also problematic is global gouging, which should also be avoided, while at the same time maximizing efficiency.

Global gouge detection algorithms are fairly well-known, and will not be discussed in detail here. They can employ surface-surface intersections, ray-firing techniques, and others. The methods described here may be implemented in conjunction with global gouge detection methods.

The initial tool position may be calculated to position the tool in an optimal way. There are multiple ways of doing this. One possible method, namely matching the curvature of the surface, to the curvature of the cutting tool, will be described here. We will present this method for two types of curves, an elliptical curve, and one type of a $2^{nd}$ order Bézier curve. It is understood that either/both of these curves may be combined with other curves in the freeform portion of the cutting edge. However, this discussion is assuming that the desired contact point on the tool has been determined to be on the chosed curve. Selecting the desired contact point (or the curve where the desired contact point should occur, is a relatively simple algorithm. It involves determining the surface curvature and then determining which curve on the freeform portion has curvature closest to that value. This is done by knowing the range of curvature values for each curve on the freeform portion, and then selecting the curve with the appropriate range. Once that is done, the following algorithm can then be applied.

The normal curvature of the surface in the plane containing the cutter contact point, the tool tip, and the tool axis, will be used. The formula for normal curvature, $\kappa_n$, is well-known in differential geometry theory, and will not be included here. When this value is determined, the point on the cutter which has the same curvature can be found, and the cutter oriented in such a way that this point on the cutter is the contact point with the surface. This can be accomplished by rotating the cutter until the tangent at the desired contact point is the same as the surface tangent at the surface contact point.

1. Elliptical Curve

First, the curvature of an ellipse is presented. For an ellipse having the formula:

$$x = a \cos(\theta)$$
$$y = b \sin(\theta)$$

the curvature at any point on the ellipse can be represented as:

$$\kappa = \frac{ab}{[a^2 \sin^2(\theta) + b^2 \cos^2(\theta)]^{1.5}}$$

This equation can be solved for the angle $\theta$, which represents the position on the cutter which has the desired curvature. The equation for $\theta$ is:

$$\theta = \cos^{-1}\left(\sqrt{\frac{(a^2 b^2 / \kappa_n^2)^{1/3} - a^2}{b^2 - a^2}}\right)$$

Not every value for a, b, and $\kappa_n$, may yield a solution (i.e. the particular elliptical shape chosen may not have curvature equal to $\kappa_n$ at any location.) In this case, the tool may be positioned parallel to the surface and then gouge-corrected until there is no gouging. In addition, in convex regions of the surface the tool may be positioned and then gouge-corrected in the same way. If curvature is used to position the tool, (once the angle $\theta$ is found), the tool may be rotated such that the desired contact point on the cutter (described by $\theta$) is the actual contact point on the surface.

The surface and the cutter should have tangent continuity at the contact point. Thus, the cutter may be rotated such that the tangent to the cutter at $\theta$ and the tangent to the surface at the contact point are the same. This may be accomplished by determining the angle ($\phi$) between the tangent to the ellipse at $\theta$, and the tangent to the ellipse at $\theta=0$. This rotation may be a positive or a negative rotation depending on the orientation of the cutter and the mathematical description of the ellipse. The equation for this angle is as follows:

$$\phi = \tan^{-1}\left(\frac{a \sin(\theta)}{b \cos(\theta)}\right)$$

Using this rotation angle will ensure that the cutter and surface have at least tangent continuity, and perhaps higher.

2. $2^{nd}$ Order Bézier

This curve is one example of the infinite number of Bézier curves which could be used to generate the cutting edge or a portion of the cutting edge. The curve in this example has the equation:

$$x = R(1-t^2)$$

$$y = L(t^2 - 2t)$$

where R is the cutter radius, L is the length of the tool tip, and t is the parameter. This type of geometry is shown in the following figure.

The curvature of this curve is:

$$\kappa = \frac{LR}{2(R^2t^2 + L^2t^2 - 2L^2t + L^2)^{1.5}}$$

When this expression is solved for t, the following formula is obtained:

$$t = \frac{2L^2 \pm \sqrt{-4R^2L^2 + (R^2+L^2)^3 \sqrt{16R^2L^2/\kappa^2}}}{2(R^2+L^2)}$$

This gives the location on the cutter where the curvature is equal to the curvature of the surface. Now, a suitable rotation angle can be found such that the desired contact point (in terms of t) is the correct contact point and the cutter and surface have the same tangent. The equation for this angle is:

$$\phi = \tan^{-1}\left(\frac{Rt}{L(1-t)}\right)$$

Again, this angle may represent a positive or negative rotation for the cutter. Another option for initial tool positioning is to position the cutter where the efficiency would be maximum (generally at the location on the cutting edge having maximum radius of curvature), and then rotate the cutter until local gouging is eliminated. One may rotate the cutter in a way which keeps efficiency at a maximum.

Given a curve formulation where it is not possible to obtain a closed form solution for t (the parameter) in terms of curvature, it is simple to use a numerical method to determine the appropriate rotation based on a given surface curvature. A numerical approach can also be used to determine rotation angle if necessary.

Here, a method for determining if a cutter gouges the design surface along the cutting edge is presented. While this is not the only method possible, it is representative of the type of method which may be employed. The following figure represents the basics of the approach.

The basic concept of this gouge detection method is to use a series of points (as shown, and represented by item 91) down the tool-axis (90), (or axis of rotation of the cutter), and determine the distance of these points from the design surface (92). The distance 'd', is taken along the surface normal (93) from the design surface which passes through the point in question. The shortest distance to a surface from a point above the surface is along the surface normal which passes through that point. If that distance 'd' is less than the distance from the point (91) to the cutting edge of the cutter, then the tool is gouging at that point. The point on the surface (94) whose normal passes through the point (91) can be found by solving the equation shown below:

$$G = P + dN$$

In this equation, G is the point on the tool-axis (91), P is the point on the surface (94), and N is the surface normal (93) at point P. This is actually a system of equations (in Cartesian x,y,z) with unknowns u, v, and d, if the design surface (92) is a parametric surface. If so, u and v represent the parameters of the surface. This system of equations can be solved (generally with a numerical method) for the (u,v) parameter values (which give us point P), and the distance, d, from G to P. This distance is then compared with the distance from G to the cutting edge of the surface to determine if the cutter is gouging at point P. If the surface is not parametric, a similar equation can also be written. This process is repeated for all points down the tool-axis, to find any gouges. This process can be repeated for all surfaces in the model.

There are multiple approaches for determining the distance from G to the cutting edge of the surface. The surface normal (93) which passes through point (91) also passes through point (95) on the cutting edge. One could compute the distance between (91) and (95) and compare it with the distance between (91) and (94). If the distance between (91) and (95) is greater, then the cutter is gouging at that location. If the distance from (91) to (94) along surface normal (93) is ever negative, that would also represent a gouge. This is true for all schemes used to determine the distance from G to the cutting edge of the surface.

Another possibility is to find the shortest distance from point (91) out to the cutting edge. This distance could be found in a way similar to the method just described which locates the shortest distance from a point to a surface. In this situation, the point on the cutting edge whose normal passes through point (91) would be found, and then the distance from that point to point 91 would be computed. This value could be found through iteration, but for some curves an explicit relationship can be found.

For the ellipse described previously, the value is:

$$l = \frac{a\cos(\lambda)}{\cos(\omega)}$$

where $$\omega = \tan^{-1}\left(\frac{a\sin(\lambda)}{b\cos(\lambda)}\right)$$

$$\lambda = \sin^{-1}\left(\frac{b-h}{b-a^2/b}\right)$$

and h is the distance from the tool tip to the point in question. If h is less than $a^2/b$, then l is equal to h.

For the second order Bézier curve described previously, the parameter value for the point on the curve which corresponds to the shortest distance to a given point on the axis is given by $$t_1 = \frac{-(R^2 - 2L^2) \pm \sqrt{(R^2 - 2L^2)^2 + 4(R^2 + L^2)y_oL}}{2(R^2 + L^2)}$$

where $y_0$ is the location of the point on the tool-axis. The above equation will yield two values but at least one will always be between 0 and 1, the limits of parameterization for a Bézier curve and one must choose the appropriate value. Once the correct value for $t_1$ is known, it is easy to evaluate the point and calculate its distance from $y_0$.

Figure 17:
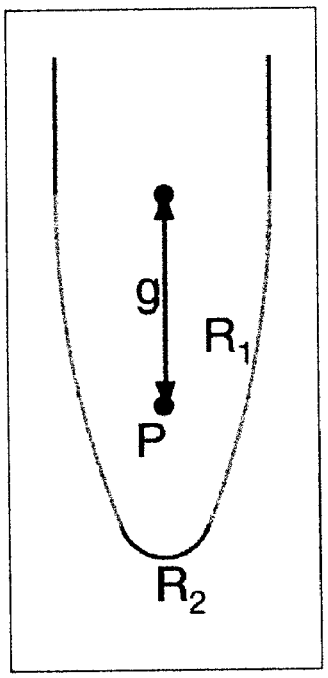
FIG. 17 is a tool silhouette that displays a value used in local gouge detection.

For a cutter whose cutting edge consists of two arcs, $R_1$ and $R_2$ where $R_1$ is larger than the tool radius, R, and $R_2$ is smaller, the distance as described above is equal to:

$$l = R_1 - \frac{R_1 - R}{\cos(\delta)}$$

where $$\delta = \tan^{-1}\left(\frac{g}{R_1 - R}\right)$$

and g is the distance from the point in question (point P in the following figure) to a point on the tool axis, at the same height as the top the top of the cutting edge (where the cutting edge has tangent continuity with a vertical shank), as is shown in FIG. 17.

Figure 18:
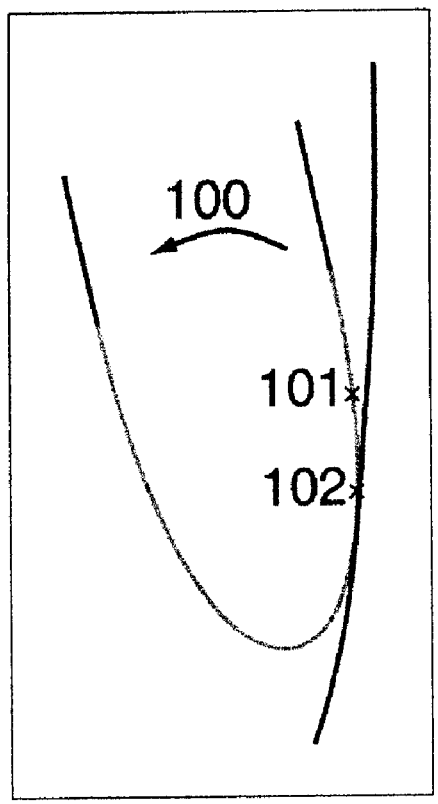
FIG. 18 is a tool silhouette that displays rotation used to correct a local gouge.

If there is a gouge, the cutter must be oriented in such a way as to eliminate the gouge. One way to accomplish this is to shift the contact point on the cutter more toward the tool tip. This is shown in FIG. 18. In this figure, by rotating the cutter in the direction indicated by (100), it has the effect of moving the contact point on the cutter from (for example) point (101) to point (102). The radius of curvature at point (102) is generally smaller than at point (101), and the cutter is often less likely to gouge. The gouge detection process may be repeated, and additional rotations performed as necessary until gouging is eliminated, or within some specified tolerance.

Local gouge detection could also be accomplished by means of a surface-surface intersection method. The surface of revolution formed by the cutter could be intersected with the surfaces in the model to determine if there are any intersections. In order to ensure no intersection at the contact point, the cutter could be offset by a small amount, perhaps 0.000001 in. along the surface normal. This would not affect the machining process, but would eliminate the potential for an intersection found at the contact point, because a surface-surface intersection may indicate a gouge.

A calculation of scallop height may be used in determining the number of tool passes necessary to create a design surface. The step-over between adjacent tool passes is often calculated based on an allowable scallop height. Here, a method for determining the scallop height is presented.

The basis for this method is similar to the gouge detection method. Using points along the tool-axis, one can determine the distance of the cutting edge of the cutter from the design surface. When this value is equal to the scallop height, one has found the point on the surface where the scallop height tolerance is met, and the location of the adjacent tool pass can be calculated from this information. The adjacent tool pass may be based on the shortest step-over distance (the distance from the contact point to the point-where the scallop height is met) along the tool path, or may use some or all of the step-over distances to compute the adjacent tool pass.

Figure 19:
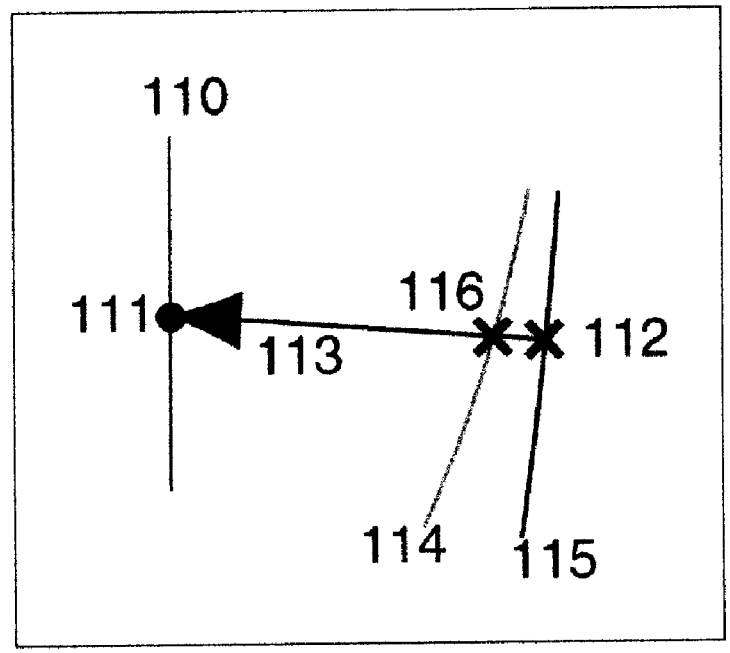
FIG. 19 is a tool silhouette that shows how scallop height can be calculated.

FIG. 19 illustrates this scallop height calculation method. In this figure, (110) represents the tool-axis, (111) a point on the tool-axis, (112) the point on the surface whose normal (113) passes through the point (111), (114) a portion of the cutting edge of the cutter, (115) a portion of the design surface, and (116) the point on the cutting edge that the surface normal (113) passes through. One must find the points (112) and (116) such that the distance between them is equal to the desired scallop height. This may be done by using a numerical method such as Newton-Raphson or secant method. If a numerical method is used, one can obtain the starting point(s) for iteration by using different points along the tool-axis (110) until the distance between points (112) and (116) is sufficiently close to begin iterating.

In order to use the scallop height algorithm, the distance from point (116) to point (111) along surface normal (113) should be found. In order to do this, one must locate point (116) so that the distance between the two can be calculated. One way to do this would be to intersect the ray defined by (113) with the surface of revolution formed by the cutting edge, which would give point (116).

The CL, or tool tip position can be found from the cutter contact point, or CC point, using the following equation:

$$CL = CC + l_n \vec{N} - l_a \vec{A}$$

In this equation, N is the surface normal, A the tool-axis vector, and $1_n$ and $1_a$ are defined depending on the type of cutter.

For an ellipse, those values can be calculated accordingly:

$$l_n = xx/\cos(\eta)$$

$$l_a = b - |yy| + l_n \sin(\eta)|$$

where $$\gamma = \tan^{-1}\left(\frac{b}{a}\tan(\eta)\right)$$

$$xx = a\cos(\gamma)$$

$$yy = b\sin(\gamma)$$

$$\eta = \cos^{-1}(\vec{A} \cdot \vec{B})$$

$$\vec{B} = \vec{T} \times \vec{N}$$

where T is the tangent to the direction of tool motion.

For the second order Bézier curve described previously, these values are as follows:

$$l_n = \frac{R(1 - t_0^2)}{\cos(\pi/2 - \eta)}$$

$$l_a = L + L(t_0^2 - 2t_0) + l_n(\vec{N} \cdot \vec{A})$$

$$\eta = \cos^{-1}(\vec{A} \cdot \vec{B})$$

$$t_0 = \frac{L}{L + R\tan(\eta)}$$

where B has the same definition as above.

There are additional methods which could be used in conjunction with these tools. It is possible that these tools will not be able to machine all regions of a part geometry, and would need to be integrated with traditional methods. By using trimming curves to define the regions which cannot be machined with these tools, and using traditional methods on the remainder, the entire geometry could be machined in an efficient manner.

With some of the cutters on certain types of geometry, the direction chosen for machining may also play a role in the efficiency of the machining process. One method for improving efficiency would be to create tool passes in the direction best suited for optimal machining, and to always attempt to orient the tool in the direction best suited for optimal machining. One could not only use the curvature along the axis as a means of placing the tool, but could use the surface curvature (potentially maximum or minimum curvature), and orient the tool based on the arbitrary cross-section which had similar curvature.

Another method for improving efficiency would be to not always position the tool such that the tool-axis is perpendicular to the direction of motion. The tool and surface geometry could be examined such that the tool is positioned optimally. This could be thought of as a rotation around the surface normal at the contact point. This method could also be used to avoid local gouging instead of simply rotating around the tool tangent, or in conjunction with that method.

Because there are so many varieties of cutter geometry possible with this invention, one could develop automated tools which would optimize the machining process based on a family of cutter geometries. It would also be possible to create routines which would custom-design a particular cutter geometry for each particular part geometry, thus creating custom cutters specifically designed for each part. These algorithms would involve examination of the surface geometry and curvatures, as well as global interference issues, and using those constraints to predict optimal cutter geometry.

These cutters can be produced on a standard NC cutter grinder. However, it may be necessary to either use a series of points along the cutter's profile to program the NC grinder, or it might also be necessary to approximate the cutter's profile (i.e. cutting edge) with an arc, line, or a series or arcs, lines, etc.

It is envisioned that this cutting method will be embedded into a computerized CAM system for generating control information for a CNC machine tool.

An additional method for which these cutters could be used is in conjunction with a modified flank milling approach. In this case, one could position the cutter not only based on a point of contact, but on a curve of contact between the surface and the cutter. These contact algorithms could be developed in a way that preserves part geometry or in a way that that allows deviations from the geometry within a certain tolerance. These cutters could potentially also allow the creation of a surface that is higher than second order.

I claim:

1. A tool for shaping a workpiece on which at least a portion of the silhouette or graphical projection of the tool has a radius of curvature larger than the smallest tool shank radius, at least a portion of the silhouette or graphical projection of the tool has a changing radius of curvature, and at least a portion of the silhouette or graphical projection of the tool is represented by a parametric curve, said parametric curve having a difference of radius of curvature, defined as the maximum radius of curvature minus the minimum radius of curvature, at least 10% greater than or less than the difference of radius of curvature of any quadratic equation of the form $y=f(x)$ passing through the same endpoints and having the same tangent directions at both endpoints as said parametric curve.

2. The tool of claim 1 on which a portion of the silhouette or graphical projection of the tool consists of at least two curves, one of which may be a curve of any form, including a straight line, joined with at least tangent continuity.

3. The tool of claim 1 in which a portion of the silhouette or graphical projection of the tool consists of at least two curves, one of which may be a curve of any form, including a straight line, joined with only $C^0$ continuity.

4. The tool of claims 1, 2, or 3 wherein the parametric curve or curves are approximated with straight line segments or arcs or a combination of both when the actual tool is made, such as when it is ground on an NC cutter grinder, when the molds for cutting inserts are created, or when the tool is created by other means.

5. A method for shaping a workpiece using the tool of claims 1, 2, or 3 said method comprising the steps of:
   (a) Identifying the desired shape of said workpiece;
   (b) Selecting said tool to shape workpiece;
   (c) Moving said tool across said workpiece so that said tool creates desired shape of said workplace.

6. A method for shaping a workpiece using the tool of 4, said method comprising the steps of:
   (a) Identifying the desired shape of said workpiece;
   (b) Selecting said tool to shape workpiece;
   (c) Moving said tool across said workpiece so that said tool creates desired shape of said workpiece.

* * * * *